UNITED STATES PATENT OFFICE.

HARVEY N. OTT AND FRANK H. BUFTON, OF BUFFALO, NEW YORK, ASSIGNORS TO SPENCER LENS COMPANY, OF BUFFALO, NEW YORK.

PROJECTION APPARATUS.

1,424,847. Specification of Letters Patent. Patented Aug. 8, 1922.

Original application filed November 13, 1919, Serial No. 337,773. Divided and this application filed January 31, 1921. Serial No. 441,126.

*To all whom it may concern:*

Be it known that we, HARVEY N. OTT and FRANK H. BUFTON, citizens of the United States, residing at Buffalo, in the county of Erie and State of New York, have invented a new and useful Improvement in Projection Apparatus, of which the following is a specification.

This invention relates to projection apparatus of the kind used for projecting images from transparent lantern slides or objects, post cards, books and other opaque objects. This application is a division of our application, Serial Number 337,773, filed November 13, 1919 and relates more particularly to the movable support for the opaque objects and its actuating means.

The objects of the invention are to provide a projection apparatus with an object holder of simple and desirable construction, which is readily operable for receiving and carrying the object to and from an image projecting position, and which may be readily manipulated to assume either an object-receiving position or an image projecting position; also to provide an improved object holder having actuating means which can either operate to releasably retain the holder in and return it to the image projecting position or permit it to remain in the object receiving position until actuated by the operator to return the holder; also to provide an object holder having elastic means for returning the holder to image projecting position and means for varying the tension of said elastic means. Further objects are to provide an apparatus of this type which permits ready manipulation of the object holder from either the ends or side of the apparatus and to provide improvements in projection apparatus of the type set forth in the other respects hereinafter described and claimed.

Figure 1:
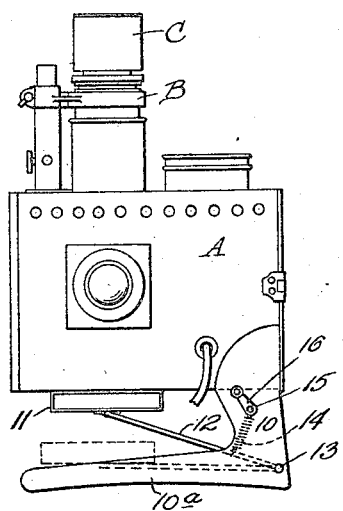
Fig. 1 is a front elevation of a projection apparatus embodying the invention.

The invention generally stated consists in a projection apparatus having improved means for actuating or controlling the operation of the holder for an opaque object, and in the provision of a hinged or pivoted object holder which is normally under the action of a spring or the like, tending to maintain it in an image projecting position, and to return it to such position when released after moving it to a receiving position, together with means for releasing or relieving the tension of the spring so as to permit the object holder to swing to and remain in an object receiving position, and improved supporting rests or legs on which the apparatus is supported so that ready access may be had to the object holder from both ends and one side beneath the apparatus.

Referring to the drawings:

A represents the casing or light chamber of an apparatus, B the opaque projection objective and C an inclined mirror or reflector for directing the image forwardly from the opaque objective B to the screen. D designates an exposure opening in the bottom of the casing for the opaque objects and E a source of light for illuminating objects held adjacent said exposure opening. The light casing or chamber is supported on legs or rests. It is preferred that the apparatus be supported by a rest or support connected to one side of the casing only, so that free access may be had from the other side and the ends beneath the casing to the exposure opening and to the object holder which will be hereinafter described. As shown, the casing is preferably provided with lateral and substantially horizontal feet or rests 10$^a$ which are connected to supporting legs 10 which project downwardly from one side of the casing. The free ends of the feet are connected and braced by a cross piece 10$^b$.

11 designates an opaque object holder which is adapted to hold objects in operative relation to the exposure opening D, so that they will be illuminated by the light from the source E. This object holder may be of any desired construction or form and is mounted for movement towards and from the exposure opening D, and for this purpose is preferably pivoted to one end of a swinging support 12 which is suitably pivoted to the apparatus. This swinging support preferably consists, as shown, of a U-shaped bail having a cross bar to which the holder is pivoted, and side arms pivoted at 13 to the supporting legs 10 for the casing.

Figure 2:
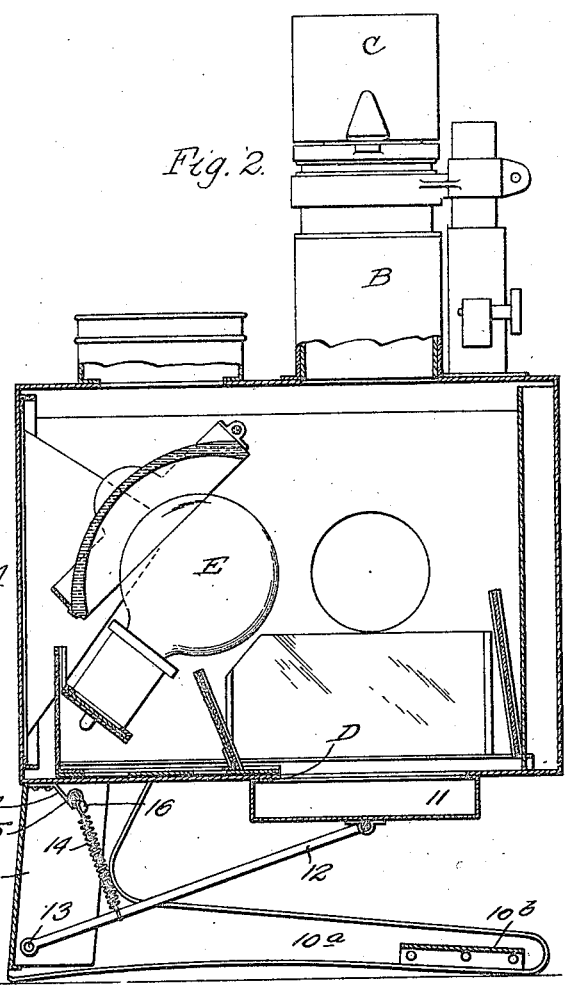
Fig. 2 is a transverse sectional elevation thereof on an enlarged scale.
Figure 3:
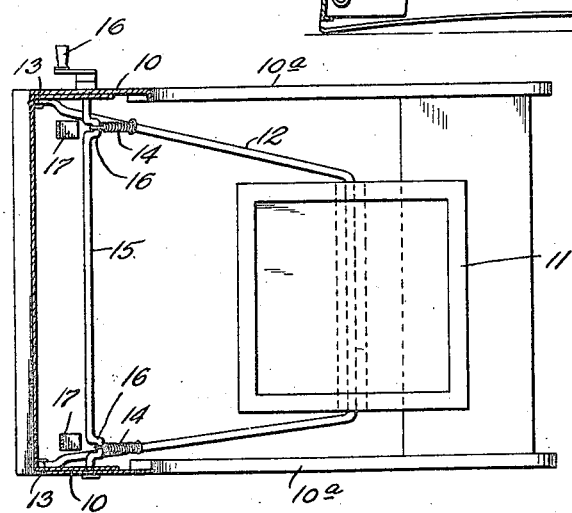
Fig. 3 is a sectional plan thereof showing the object holder in lowered or object receiving position.

14 designates coil springs connected to the arms of the support 12 between their ends, and which are normally adapted to retain the object holder 11 in its upper or image projecting position, wherein the object holder is adapted to support an object immediately adjacent the exposure opening D. 15 designates a rock shaft suitably journalled in the legs 10 or other part of the apparatus and extending transversely thereof above the bail 12. The rock shaft 15 is provided with a suitable actuating handle 16 which projects out at one end of the casing. The rock shaft 15 is also provided with spring tensioning members each connected to one end of one of the springs 14, whereby upon turning the rock shaft to one position, the swinging support 12 of the object holder will be placed under spring tension, tending to maintain the object holder in its raised image projecting position, from which position the object holder may be readily moved by pressing it down with the hand, at the same time the object holder constantly tending to return to its image projecting position. The spring tensioning members permit, upon actuation of the rock shaft 15, of the object holder being relieved of spring tension so that it can swing downwardly to object receiving position, and remain there until the shaft 15 is again actuated to place the swinging support 12 of the object holder under tension. In the preferred form of the invention shown, the shaft 15 is provided with a pair of offset or crank portions 16 which are connected to the free ends of the respective springs 14. If the shaft is turned to the position shown in Fig. 2 in which the crank portions project upwardly, the springs will be placed under sufficient tension to hold the object holder up in its raised position, whereas, if the shaft is turned so that the crank portions extend downwardly, the tension of the springs will be relieved enough to allow the object holder to descend to and remain in its lowered position. In order to limit the rocking movement of the shaft so as to prevent the shaft being accidentally turned beyond its full tensioning position, one or more stops is or are provided which arrest the movement of the shaft when full spring tension is exerted on the swinging support. As shown, these stops are formed by tongues 17 rigidly attached to and depending from the bottom of the light casing in position to engage the crank portions 16 of the shaft 15 when the shaft is turned to the position shown in Fig. 2 of the drawings.

In the preferred embodiment of the invention illustrated, the object holder is provided with a pair of hinged supporting arms 12, and the arms are placed under tension by a pair of springs 14, each connected to one of the arms and to one of a pair of crank portions on the shaft 15. While this construction is preferred, it is obvious that the form of the swinging support and the number of springs therefor, as well as the number of and disposition of the crank portions or other tension devices on the shaft may be varied without in any way departing from this invention.

In the operation of this device the object holder arm may remain under spring tension and the object holder be depressed or moved away from the exposure opening D by hand, the object inserted or removed and the object holder then released, whereupon it will automatically reassume its image projecting position. In such operation it is necessary to hold the object holder down while placing the objects thereon or removing them. In certain cases it is desirable that the objects be removed or placed on the object holder with both hands, in which event the actuating handle 16 may be turned to relieve the spring tension, whereupon the object holder will swing down to and remain in object receiving position. The object may then be inserted and the handle again actuated to cause the springs to raise the object holder. The shaft 15 permits of a ready regulation of the spring tension applied to the holder carrying arm, so that for a machine adapted to be used in connection with relatively heavy objects a strong spring may be used, and when using relatively light objects with such apparatus, the spring tension may be relieved to a sufficient extent by turning the rock shaft so as to prevent any violent movement or contact of the parts when the object holder, while under spring tension, is withdrawn from image projecting position and released to be returned to such position. The provision of vertical legs beneath one side of the apparatus only permits of free insertion of the hand of the operator beneath the casing at either end or one side of the apparatus to manipulate the object holder and insert or remove objects.

We claim as our invention:—

1. In a projection apparatus, the combination with a light casing, a source of light therefor, and a projection objective, said casing having an exposure opening for objects, of an object holder adapted to hold an object in image projecting relation to said exposure opening, said object holder being mounted to swing to and from image projecting and object receiving positions, a crank shaft journalled in said apparatus, a crank on said crank shaft, and a spring connected at one end to said crank and at its other end to said object holder.

2. In a projection apparatus, the combination with a light casing, a source of light therefor, and a projection objective, said casing having an exposure opening for objects, of an object holder adapted to hold an object in image projecting relation to said exposure opening and being movable to and from image projecting and object receiving positions, an actuating spring for said object holder, and a device cooperating with said spring and operable to place said spring under tension for releasably holding the object holder in image projecting position and to relieve the tension to permit the object holder to move away from said position.

3. In a projection apparatus, the combination with a light casing, a source of light therefor, and a projection objective, said casing having an exposure opening for objects, of an object holder adapted to hold an object in cooperative image projecting relation to said exposure opening, a swinging support on which said object holder is pivoted, a pivotal connection between said support and said apparatus, a crank shaft journalled in said apparatus, a crank on said crank shaft, and a spring connected at one end to said crank and at its other end to said swinging support.

4. In a projection apparatus, the combination with a light casing, a source of light therefor, and a projection objective, said casing having an exposure opening for objects, of a support pivoted to said apparatus, an object holder hinged to said support, said object holder being movable to and from image projecting position relative to said exposure opening and object receiving position away from said exposure opening, a spring attached to said support, a movable spring tension-controlling device connected to said spring and operable from the outside of said casing for tensioning said spring to maintain said object holder in image projecting position or for relieving tension on said spring to permit said object holder to move to object receiving position.

5. In a projection apparatus, the combination with a light casing having an exposure opening, and a source of light, of a pair of supporting arms pivoted to said apparatus, an object holder connected to said supporting arms, a rock shaft journalled in said apparatus, a pair of spring tensioning devices on said shaft, and springs connected to said spring tensioning devices and to said supporting arms, whereby said object holder may be resiliently held in cooperative relation with said exposure opening or permitted to rest in object receiving position away from said exposure opening.

6. In a projection apparatus, the combination with a light casing, a source of light therefor, and a projection objective, said casing having an exposure opening for objects, of a support pivoted to said apparatus, an object holder hinged to said support, said object holder being movable to and from image projecting position adjacent said exposure opening and object receiving position away from said exposure opening, a spring acting on said support, a spring tensioning device movably mounted in said apparatus and cooperating with said spring, whereby by moving said device to different positions said spring may be tensioned to maintain said object holder in image projecting position or relieved of tension to permit said object holder to move to and remain in object receiving position, and a stop for preventing movement of said device in one direction beyond full spring tensioning position.

7. In a projection apparatus, the combination with a light casing, a source of light therefor, and a projection objective, said casing having an exposure opening for objects, of a supporting arm pivoted to said apparatus, an object holder hinged to said supporting arm, said object holder being movable to and from image projecting position adjacent said exposure opening and object receiving position away from said exposure opening, a spring attached at one end to said supporting arm, a crank mounted in said apparatus and connected to the other end of said spring, whereby said spring may be tensioned to maintain said object holder in image projecting position or relieved of tension to permit said object holder to move to and remain in object receiving position, and a stop arranged to be engaged by said crank when said spring is tensioned to prevent further movement of said crank.

8. In a projection apparatus, the combination with a light casing, a source of light therefor, and a projection objective, said casing having an exposure opening in its bottom, of supporting legs at one side of said casing, and lateral rests extending from said supporting legs beneath said casing and spaced below the same, whereby free access is permitted to said exposure opening from the ends and one side beneath said casing, and an object holder pivoted to one of said legs and movable to and from operative position relatively to said exposure opening.

9. In a projection apparatus, the combination with a light casing, a source of light therefor, and a projection objective, said casing having an exposure opening in its bottom, of supporting legs at one side of said casing, lateral rests extending from said supporting legs beneath said casing and spaced below the same, whereby free access is permitted to said exposure opening from the ends and one side beneath said casing, an object holder pivoted to one of said legs and movable to and from operative position relatively to said exposure opening, a crank journalled in said legs, and a spring connected with said crank and said object holder, whereby by turning said crank said object holder may be resiliently held in operative position relatively to said exposure opening or permitted to remain out of operative position relatively thereto.

10. In a projection apparatus, the combination with a light casing, a source of light therefor, and a projection objective, said casing having an exposure opening in its bottom, of a lateral rest connected to one side of said casing and extending beneath said casing and spaced from the bottom thereof so that said casing is supported by said lateral rest and free access is permitted to said exposure opening from beneath said casing at the ends and one side of said apparatus, and an object holder mounted to move in the space beneath the bottom of said casing to and from said exposure opening.

Witness our hands this 7th day of January, 1921.

HARVEY N. OTT.
FRANK H. BUFTON.

Witnesses:
A. O. POTTER,
C. H. ASH.